United States Patent [19]

Mock

[11] Patent Number: 4,486,954
[45] Date of Patent: Dec. 11, 1984

[54] HOLE ANGULARITY INSPECTION DEVICE

[76] Inventor: William L. Mock, 8832 Mohawk Way, Fair Oaks, Calif. 95628

[21] Appl. No.: 286,928

[22] Filed: Jul. 27, 1981

[51] Int. Cl.$^3$ .............................................. G01B 5/00
[52] U.S. Cl. ................................ 33/174 Q; 33/172 R
[58] Field of Search ............ 33/174 Q, 174 M, 174 R, 33/169 D, 172 D, 172 R; 279/2 R

[56] References Cited

U.S. PATENT DOCUMENTS

| 133,272 | 11/1872 | Tully | 279/2 R |
|---|---|---|---|
| 599,275 | 2/1898 | Webb | 279/2 R X |
| 2,700,224 | 1/1955 | Johnson | 33/199 |
| 2,739,389 | 3/1956 | Carter | 33/174 L |
| 2,765,539 | 10/1956 | Sear | 33/181 AT |
| 2,956,342 | 10/1960 | Eisele | 33/174 |
| 2,975,524 | 3/1961 | Field | 33/174 |
| 3,114,978 | 12/1963 | Porter | 33/174 |
| 3,162,953 | 12/1964 | Porter | 33/174 |
| 3,206,858 | 9/1965 | Bernard | 33/174 |
| 3,254,416 | 6/1966 | Eisele | 33/174 Q |
| 3,296,705 | 1/1967 | Johnson | 33/172 X |
| 3,343,269 | 9/1967 | Eisele | 33/174 |
| 3,392,453 | 7/1968 | Snoddy | 33/174 |
| 3,534,480 | 10/1970 | Webb | 33/174 Q |
| 3,606,686 | 9/1971 | Righter | 33/174 |
| 3,837,085 | 9/1974 | Dunn | 33/174 Q |
| 4,219,936 | 9/1980 | Bridges | 33/174 Q |
| 4,222,173 | 9/1980 | Hall | 33/180 R |

FOREIGN PATENT DOCUMENTS

| 1074362 | 1/1960 | Fed. Rep. of Germany | 279/2 R |
|---|---|---|---|
| 564511 | 8/1977 | U.S.S.R. | 33/174 L |
| 642602 | 1/1979 | U.S.S.R. | 33/174 Q |

Primary Examiner—Harry N. Haroian
Attorney, Agent, or Firm—Donald J. Singer; Frank J. Lamattina

[57] ABSTRACT

A device which is useable to determine whether a hole is straight (i.e., perpendicular) with respect to the planar surface of the workpiece in which the hole is formed. The device structurally comprises a rotatable shaft member having a collar with a centrally-located bore in which is held a probe (i.e., a mandrel) that is to be inserted into the hole to be checked. The collar also has an off-set bore which holds a horizontally slidably movable plunger of the vertically reciprocating type. A dial indicator is operably connected to the plunger. To test the hole for perpendicularity, the probe is inserted in the hole; the collar is rotated completely around the hole, and, the plunger follows the surface around the hole. If there is no change in the dial indicator reading, the hole is straight. If there is a change in the dial indicator reading, the hole is not straight; and, the lowest reading is subtracted from the highest reading. The difference in these readings constitutes the numerical value of the tangent of the angle by which the hole has been displaced from the perpendicular, relative to the planar surface of the workpiece.

1 Claim, 7 Drawing Figures

HOLE ANGULARITY INSPECTION DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates to a device which is useable to ensure that a hole has been formed perpendicular to a surface and, more particularly, to a device for indicating and measuring the angularity (i.e., the angular displacement or deviation), if any, of a straight-walled hole which is in a workpiece, with the angularity being measured with respect to (i.e., relative to) the planer surface where the hole has its entrance opening in the workpiece.

It is well known that it is important to determine if a straight-walled hole (as distinguished from a tapered-walled hole) which is formed in a workpiece is in fact "straight", i.e., perpendicular to the surface of a workpiece into which the hole is formed. The importance varies, but in aircraft it is of critical importance that holes intended to be straight are, in fact, straight. For example, if fasteners are installed in a crooked hole in a structural component of an aircraft, undue and unexpected stress will develop, with possible very unfortunate results. As a result, "straight" holes are routinely inspected to determine that they are straight.

It is also well known that prior art devices and methods used for determining if a hole is straight are time-consuming and, therefore, costly to use. It is equally well known that those devices which are used for the aforementioned purpose and are not time consuming are, nevertheless, complex in structure and, therefore, costly to manufacture or buy.

SUMMARY OF THE INVENTION

The instant invention performs the above-mentioned desired goals of being useable to ascertain if a hole is straight, while at the same time being economical to buy (or to manufacture), and quick and easy to use. It, therefore, comprises a significant advance in the state of the art.

An oversimplified structural description of the instant invention is that it comprises, in combination, a means for following the angular displacement (if any) of the centerline of a hole in a workpiece which is intended to be straignt (i.e., perpendicluar) with respect to the planar surface of the workpiece in which the entrance opening of the hole is located, and, means for indicating and measuring the followed angular displacement (if any) of the centerline. It is here to be noted that, if the centerline is perpendicular, (i.e., the hole is straight in the workpiece), then of course there is no angular deviation.

More specifically, the instant invention (which sometimes hereinafter may be referred to as the "angularity inspection device") includes in a preferred embodiment which will be described in detail later herein: a probe (or mandrel) member which is inserted into the hole to be checked or inspected; a rotatable member shaft that is external of and larger than the hole, and that is connected to the probe member, with the shaft member having a collar at end away from the hole; and a dial indicator which has a plunger housing attached thereto and a plunger (i.e., a horizontally slidable movable and vertically reciprocally movable member), and which is attached to the collar of the shaft member by way of the plunger housing. In operation, after the probe member is inserted into the hole to be checked, the collar of the shaft member is rotated completely around the hole opening, while the plunger is pressed against and follows the planar surface that surrounds the entrance opening of the hole. If there is any angular displacement of the hole relative to the planar surface (i.e., if the hole is not straight), the plunger vertically reciprocates and thereby actuates the dial indicator, moving the pointer of the indicator to give a high and a low reading from which the actual angularity of the hole can be calculated, if desired. Of course, the dial of the dial indicator can be appropriately calibrated by a person of ordinary skill in the art to give specific angular displacement of a "crooked" hole, if holes of the same size (rather than holes of a size within a range) are to be checked. It is here to be noted that suitable dial indicators including the plunger housing and plunger are commercially available "off-the-shelf" from a great number of companies, including the Gem Instrument Co. of Clevelend, Ohio 44113. It is also here to be noted that, if the hole is straight, the plunger will not reciprocate, and therefore there will be no change in reading on the dial (or, if the pointer is set at the zero graduation on the dial, the pointer will not move).

The instant invention overcomes the problems set forth hereinabove by providing a simply structured and easy to use angularity inspection device which utilizes a simplified geometric and trigonometric approach for determining the angularity, if any, of a straight-walled hole having its entrance opening in the planar surface of a workpiece.

Accordingly, it is an object of this invention to provide a device (i.e., a tool) for indicating if a straight-walled hole formed in a workpiece is in fact straight (i.e., perpendicular) with respect to the planar (i.e., flat) surface of the workpiece in which the entrance opening of the hole is located.

It is another object of this invention to provide a device which measures the angular displacement or deviation of the aforesaid hole relative to the planar surface, if in fact the aforesaid hole is not straight in the workpiece.

It is still another object of this invention to provide a device as hereinabove described which is adaptable for use with any size hole, or for use with holes within a preselected range of sizes.

It is a further object of this invention to provide such a device as above-described that is simple in structure (i.e., comprises a minimal number of components) and, therefore, is relatively easy and inexpensive to manufacture.

It is a still further object of this invention to provide a device which can be used easily and quickly by one individual without any special technical skill.

Yet another object of this invention is to provide a device which is structurally integrated (i.e., unified).

These objects of this invention, as well as other objects related thereto, will become readily apparent after a consideration of the description of the invention, together with reference to the contents of the Figures of the drawing.

DESCRIPTION OF THE PREFERRED EMBODIMENTS

Figure 1:
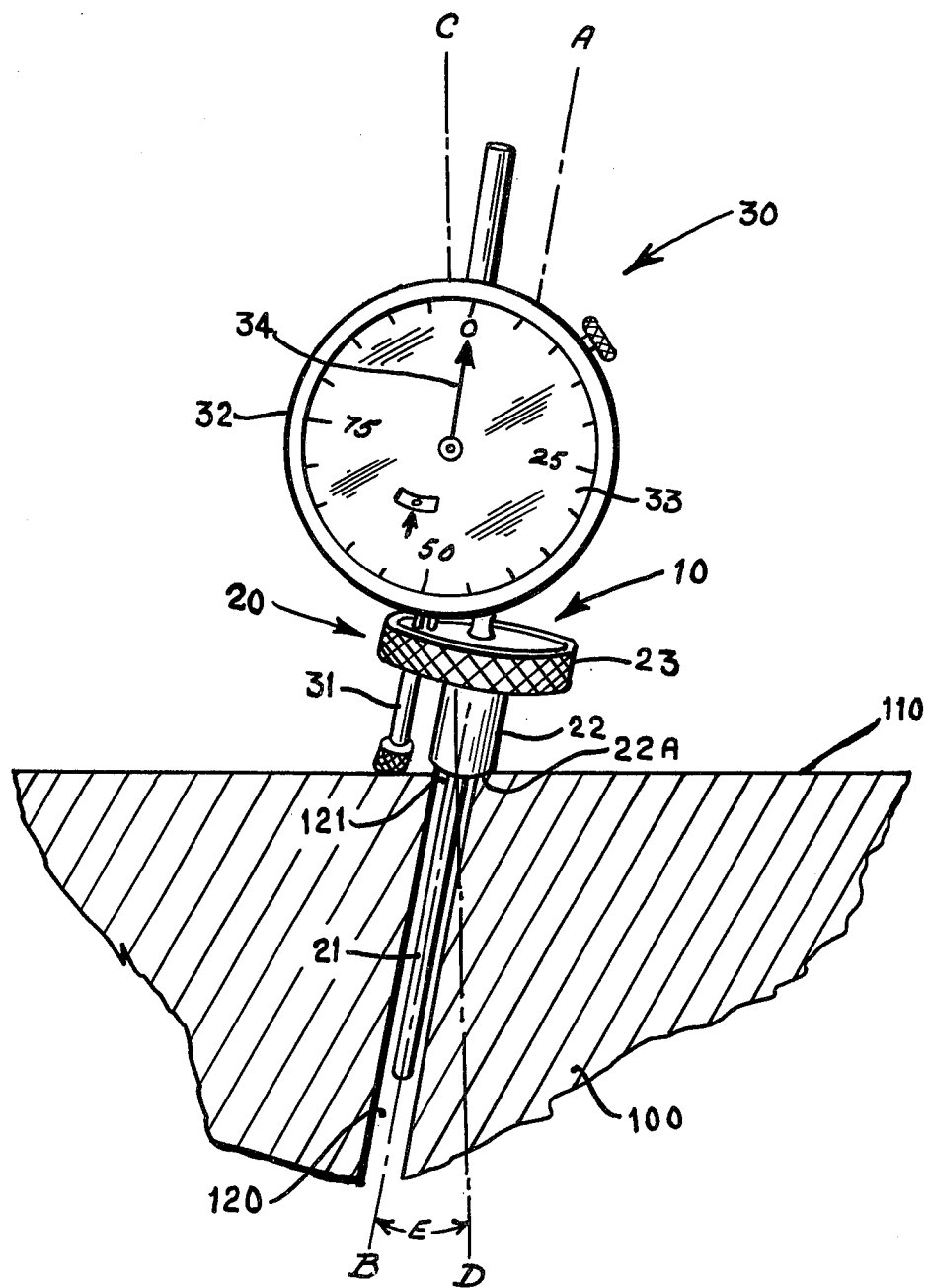
FIG. 1 is a front view, in simplified pictorial and schematic form, of a preferred embodiment of the invention while in use in its working environment.

With reference to FIG. 1, therein is shown a preferred embodiment 10 of the instant invention in a typical working environment, i.e., while in use to determine whether straight-walled hole 120, which has an entrance opening 121 in planar surface 110 of workpiece 100, is positioned straight in the workpiece 100.

Figure 2:
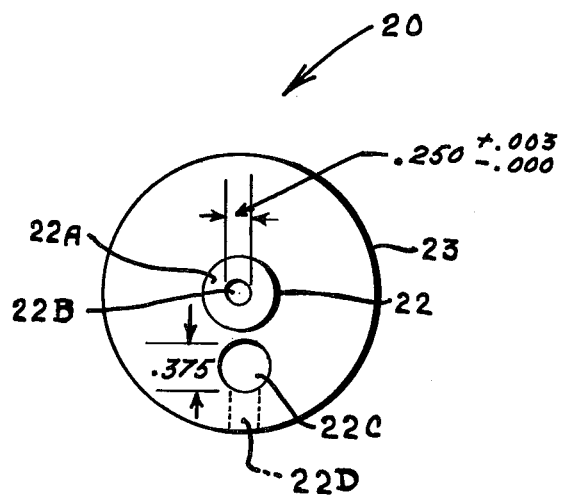
FIG. 2 is a bottom view, in simplified pictorial and schematic form, of the shaft component, and of the collar component thereof, of the invention.
Figure 3:
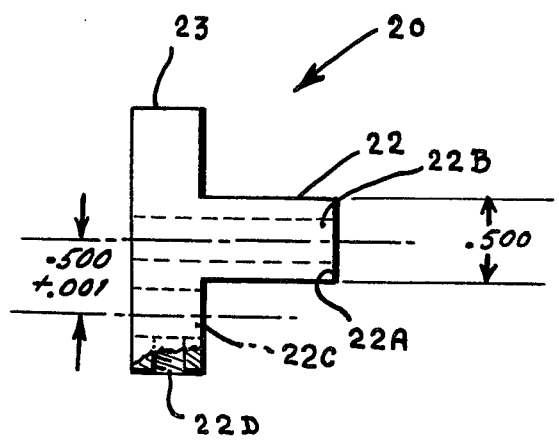
FIG. 3 is a side elevation view, in simplified pictorial and schematic form, of the shaft and its collar shown in FIG. 2.

In the most basic and generic structural form, and with reference to FIGS. 1-3, inclusive, the instant invention 10 comprises: a means (generally desitnated 20) for following the angular displacement, if any, of the hole 120 (or, more accurately, of the centerline A-B of the hole 120) with respect to the planar surface 110 of the workpiece 100; and, a means generally designated 30) for indicating and measuring the followed angular displacement of the centerline A-B, with this means 30 operably associated with the means 20 for following the angular displacement, if any, of the centerline A-B. More specifically, the angular displacement following means 20 includes: a probe member 21 that is inserted into the hole 120 through the entrance opening 121; and, a rotatable shaft member 22 that is larger than the entrance opening 121 of the hole 120, that is disposed external of the hole 120, that is positioned such that it (i.e., the shaft member 22) is in contact with the planar surface 110 of the workpiece 100, and that is connected to the probe member 21.

The probe member 21 is rod-like in shape and has a first end and a second end, with the first end inserted into the hole 120. The shaft member 22 has a first end 22A that is larger than the entrance opening 121 of the hole 120, and a second end with a collar 23. The first end 20A of the shaft member 22 is connected to the second end of the probe member 21; is disposed above the entrance opening 121 of the hole 120; and is, at least partially, in contact with the planar surface 110 immediately adjacent to the entrance opening 121 of the hole 120. It is here to be noted that the probe member 21 and the shaft member 22 are connected in a coaxial relationship, as is shown in FIG. 1.

The means 30 for indicating and measuring the followed angular displacement includes a conventional plunger 31 of the type that is horizontally slidable and that concurrently can be made to reciprocate within plunger housing 35 in a vertical direction upon application of pressure. Such a plunger is available from any one of the many dial indicator manufacturing companies. The tip of the plunger 31 is in contact with the planar surface 110, and the plunger 31 is disposed in a parallel, equal, spaced-apart relationship with the probe member 21. The distance between the plunger 31 and the probe member 21 is predetermined, based upon the size of the hole to be checked, as will be discussed later herein.

As can be seen in FIG. 1, this means 30 is operably connected by its plunger housing 35 to the collar 23 of the shaft member 22 of the angular displacement following means 20. As stated above, means 30 also includes a dial indicator 32 which is connected to, and is actuated by, the up-and-down reciprocating action (if any) of the plunger 31. The face or dial 33 of the dial indicator 32 is calibrated in preselected graduations (such as 0.001 of an inch as is shown in FIG. 1), depending upon the size (or range of sizes) of the hole to be checked, as will be discussed later herein. The dial indicator 30 also has a pointer 34 whose each complete revolution around the face 33 of the dial indicator 32 constitutes a preselected length of vertical movement (such as one inch) of the plunger 31, depending upon the size of the hole, as will be described later herein.

With reference to FIGS. 2 and 3, therein is shown the shaft member 22 in, respectively, the bottom view and a side elevation view. The shaft member 22 has a center bore 22B (i.e., a centrally located hole extending through the shaft member 22) into which the holding end B, FIGS. 4A-4D, inclusive, of the probe used as such probe 21, FIG. 1), is slid for the entire length of the bore 22B. The shaft member 22 also has an off-set bore 22C through which is passed the plunger housing 35 and plunger 31, FIG. 1, to which is connected the dial indicator 32. The plunger housing 35 is held in place by use of a set screw 22D which, together with the collar 23, supports the dial indicator 32.

Figure 4A:
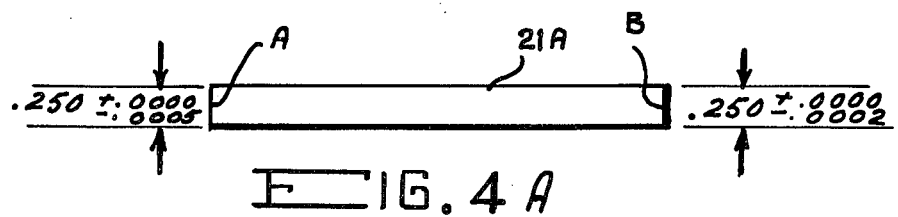
FIGS. 4A-4D, inclusive, are differently sized probes (i.e., mandrels) that are representative of the probe component that can be used in the preferred embodiment of the invention.
Figure 4B:
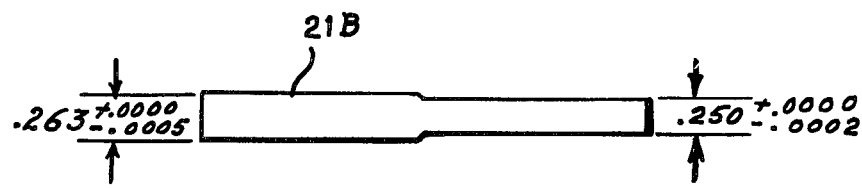
Figure 4C:
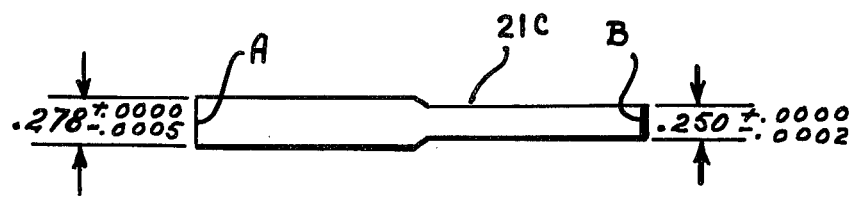
Figure 4D:
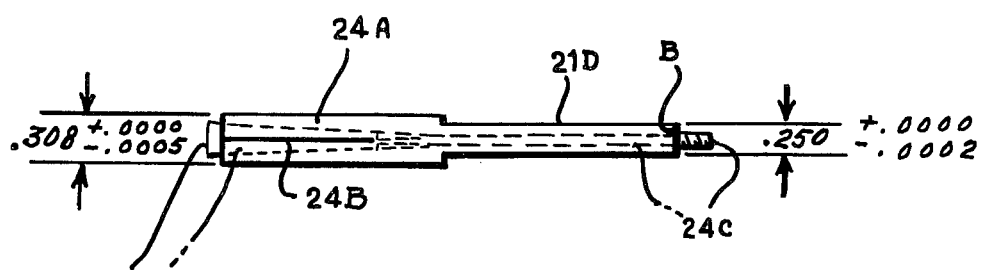

As a matter of preference, the probe member 21 is in the form of a mandrel. In that regard, and with reference to FIGS. 4A, 4B, and 4C, therein are shown three representative solid mandrels 21A, 21B, and 21C. The holding end B of each mandrel or probe is the same size as will be explained later herein, whereas the probe end A of each mandrel is differently-sized to fit differently sized holes. In FIG. 4D is shown mandrel 21D which is of the expanding type, rather than of the solid type represented by mandrels 21A, 21B, and 21C. To those readers not of the art, it is important to know that expanding type mandrels, such as 21D, FIG. 4D, comprise an external shell 24A with a slit 24B, a long threaded bolt 24C disposed mostly internal of the shell 24A, and a truncated cone-like shaped nut 24D mostly internal of the shell 24A and threadedly engaged with the bolt 24C. When the nut 24D is driven inwardly along the bolt 24C, the shell 24A expands and gives a really snug fit on the hole 120, thereby making it easier to use the angularity inspection device 10. Also as a matter of preference and not of limitation, the probe member 21 (and, the mandrels 21A-21D), the shaft member 22, and the plunger 31 are made of metal.

MANNER OF USE AND OF OPERATION OF THE PREFERRED EMBODIMENT

The manner of use, and of operation, of the preferred embodiment 10 of the instant invention can be easily ascertained, by any person of ordinary skill in the art, from the foregoing description, coupled with reference to the contents of the Figures of the drawing, most particularly from FIG. 1. Succinctly, the instant invention 10 makes use of my discovery that the net vertical displacement of plunger 31 (as such displacement is shown or is calculated from readings on dial indicator 21), which is caused by the plunger 31 being rotated slidably on the planar surface 110 all around the entrance opening 121 of the hole 120, is equal to the tangent of the angle E through which the hole 120 has been displaced from the perpendicular (i.e., axis C–D) to the surface 110.

For others, the following explanation is given. Assuming as indicated hereinbefore, that the instant invention 10, FIG. 1, is to be used to determine if the hole 120 in workpiece 100 is straight (i.e., if it is perpendicular to the flat surface 110 of the workpiece 100), the user positions the unified (i.e., integrated) device 10 such that the probe member 21 is inserted into the hole 120 while, at the same time, the first end 22A of shaft member 22 and the tip of plunger 31 are both in contact with, and remain in contact with, the surface 110. Then, the collar 23 of shaft member 22 is rotated. As a result of the rotation of collar 23, the interconnected plunger 31 rotates with the collar 23, follows the surface 110, and actuates the dial indicator 32 whenever the length of the plunger 31 changes. The collar 23 is rotated until the plunger 31 has travelled completely around the entrance opening 121 of the hole 120, and the lowest reading and the highest reading that are shown on the dial indicator 32 are noted. Then, the low reading is subtracted from the high reading, and the difference is the numerical value of the tangent of the angular devitaion. The degrees of the angle (i.e., angle E, FIG. 1) of this deviation can be found simply by checking any trigonometric tangent function value chart, or by dividing the numerical value of the tangent of the angular deviation by 0.0175 which is the numerical value of the tangent of an angle of one degree.

Of course, if the dial indicator 32 does not indicate any change in reading, then the hole being tested is in fact perpendicular to the surface 110; and, therefore, the hole is positioned straight in workpiece 100. Obviously hole 120, FIG. 1, is not straight.

As a matter of interest to the reader, I have found that if the components of the invention 10 are dimensioned as shown in FIGS. 2, 3, and 4A–4D, inclusive, the angularity of a hole having a diameter of from one-eighth of one inch to three-quarters of one inch can be checked, depending upon which of the mandrels shown in FIGS. 4A–4D fits the hole most snugly and therefore is used. It is to be noted from FIG. 3 that the distance between the mandrel centrally-locate bore 22B and the off-set plunger bore 22C is one-half of one inch. Therefore, the diametric length which is spanned by the plunger 31 in being rotated completely around the hole to be tested is one inch.

I have found that this one inch length constitutes the length of one leg of a right triangle, with the displacement angle (such as angle E, FIG. 1) defined by this leg and by the hypotenuse of the triangle. The leg of this triangle which is opposite the displacement angle represents the length of the net vertical linear displacement of plunger 31 as it reciprocally moves from its longest vertical length while in contact with surface 110 to its shortest vertical length while in contact with surface 110. Since the length of the leg of the triangle which is adjacent to the displacement angle is always one (1), the numerical value of the tangent of the displacement angle (such as angle E, FIG. 1) is always the length of the leg of the triangle which is opposite to the displacement angle. As a consequence, the length of this opposite leg is numerically equal to the net vertical linear displacement of plunger 31. Accordingly, I find it convenient to have the dial 33 of the dial indicator 32, FIG. 1, calibrated in gradiations of one-thousand of one inch, such that a one inch vertical linear displacement of plunger 31 will cause the pointer 34 to make one complete revolution of the dial 33.

CONCLUSION

It is abundantly clear from all of the foregoing, and from the contents of the Figures of the drawing, that the stated objects of the instant invention 10, an angularly inspection and measurement device, as well as other objects related thereto, have been achieved.

It is noted that, although there has been described and shown the fundamental and unique features of the instant invention, as applied to a preferred embodiment 10 thereof, nevertheless various other embodiments, variations, adaptations, substitutions, additions, omissions, and the like may occur to and can be made by those of ordinary skill in the art. For example, the instant invention 10 can be dimensioned and configurated to check the angularity of any hole larger than the small hole 120 that has been used herein for illustrative purposes; and, the instant invention 10 can also be dimensioned and configurated to determine the angularity of a shallow hole having a reachable bottom wall.

What is claimed is:

1. A device for measuring the perpendicularity and angularity of the centerline of a straight-walled hole having a diameter in the range of from ⅛ inch to ¾ inch in a workpiece with respect to a planar surface of said workpiece, wherein said hole has an entrance in said surface, said device comprising:

a. means for following angular displacement of said centerline of said hole with respect to said planar surface, wherein said means includes
      (1) a probe member, said probe member having a first end and a second end and being of a rod-like shape having a hollow longitudinally extending portion therein, the interior wall of said probe member surrounding said hollow portion being threaded and defining a female portion, a longitudinally extending element located within said hollow portion of said probe member and having a truncated cone-like configuration adjacent said first end of said probe member and a rod-like configuration for its remaining length and having external threads thereon and defining the male portion, wherein the external size of said first end of said probe member can be adjusted by rotating said longitudinally extending element within said probe member, and said first end of said probe member capable of being inserted into said hole so as to have a snug fit;
      (2) a rotatable shaft member, said shaft member having a flat first end larger than said entrance opening of said hole, disposed external of said hole, and positioned such that it is in contact with said surface, and a second end with a collar, wherein said first end of said shaft member is fixedly connected in coaxial relationship to said second end of said probe member wherein said probe member rotates with said rotatable shaft member; and
   b. means for indicating and measuring said followed angular displacement of said centerline, said indicating and measuring means including a plunger housing, a plunger which is vertically movable with respect to said plunger housing and with respect to said planar surface, and a dial indicator operably connected to said plunger and actuated by said vertical movement thereof, said plunger being in contact with said surface, and also being disposed in parallel, spaced-apart relationship with said probe member, and wherein said plunger housing operably connects said indicating and measuring means to said collar of said shaft member;

whereby shen said shaft member is rotated, said dial indicator indicates and measures perpendicularity or any angular displacement of said centerline with respect to said planar surface of said workpiece.

* * * * *